United States Patent
Chai et al.

(10) Patent No.: US 11,460,868 B2
(45) Date of Patent: Oct. 4, 2022

(54) FLOW SPLITTER AND RAIN SEPARATOR COMPRISING THE SAME

(71) Applicant: Chongqing University, Chongqing (CN)

(72) Inventors: Hongxiang Chai, Chongqing (CN); Xinlu Yang, Chongqing (CN); Zhiyu Shao, Chongqing (CN); Qiang He, Chongqing (CN); Yan Yang, Chongqing (CN); Yue Shen, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 387 days.

(21) Appl. No.: 16/782,013

(22) Filed: Feb. 4, 2020

(65) Prior Publication Data

US 2020/0293069 A1    Sep. 17, 2020

(30) Foreign Application Priority Data

Mar. 11, 2019  (CN) .......................... 201910179522.5

(51) Int. Cl.
| | | |
|---|---|---|
| *E03F 5/10* | (2006.01) | |
| *G05D 7/01* | (2006.01) | |
| *E03B 3/02* | (2006.01) | |
| *E03F 5/04* | (2006.01) | |
| *E03F 1/00* | (2006.01) | |
| *E03F 5/12* | (2006.01) | |

(52) U.S. Cl.
CPC ............... *G05D 7/018* (2013.01); *E03B 3/02* (2013.01); *E03F 1/00* (2013.01); *E03F 5/04* (2013.01); *E03F 5/107* (2013.01); *E03F 5/12* (2013.01); *E03F 2201/10* (2013.01)

(58) Field of Classification Search
CPC ..... E03F 1/00; E03F 5/04; E03F 5/403; E03F 5/0404; E03F 5/101; E03F 5/107; E03F 5/12; E03F 5/14; E03F 2201/10; E03B 3/02
USPC .............. 210/163, 164, 170.03, 747.2, 747.3
See application file for complete search history.

(56) References Cited

U.S. PATENT DOCUMENTS

| | | | | |
|---|---|---|---|---|
| 371,697 | A * | 10/1887 | Miller ....................... | E03B 3/02 210/421 |
| 4,578,188 | A * | 3/1986 | Cousino .................... | E03F 5/12 210/170.03 |
| 6,086,758 | A * | 7/2000 | Schilling ............... | E03F 5/0404 210/164 |
| 6,955,756 | B2 * | 10/2005 | Fallon ....................... | E03F 5/12 210/170.03 |

(Continued)

*Primary Examiner* — Christopher Upton
(74) *Attorney, Agent, or Firm* — Matthias Scholl P.C.; Matthias Scholl (57) ABSTRACT

A flow splitter including a first plate being immobile and a second plate being turnable with respect to the first plate. The first plate includes a central part, and the central part includes a slot and two side parts disposed at two ends of the slot, respectively. The second plate includes a first subplate and a second subplate, and the first subplate includes one end provided with a flange. The second plate is coupled to the first plate. The first subplate and the second subplate are disposed at two side of the slot; two sides of the second plate include two gaps, respectively. The two side parts of the first plate are disposed in the two yaps, respectively.

5 Claims, 8 Drawing Sheets

(56) References Cited

U.S. PATENT DOCUMENTS

| | | | |
|---|---|---|---|
| 2005/0082211 A1* | 4/2005 | Wade | B01D 21/02 210/170.03 |
| 2008/0060986 A1* | 3/2008 | Lee | E03F 5/0404 210/170.03 |
| 2016/0186422 A1* | 6/2016 | Braun | E03F 1/00 210/801 |

* cited by examiner

FLOW SPLITTER AND RAIN SEPARATOR COMPRISING THE SAME

CROSS-REFERENCE TO RELATED APPLICATION'S

Pursuant to 35 U.S.C. § 119 and the Paris Convention Treaty, this application claims foreign priority to Chinese Patent Application No. 201910179522.5 filed Mar. 11, 2019, the contents of which, including any intervening amendments thereto, are incorporated herein by reference.

BACKGROUND

The disclosure relates to the technical field of rainwater collection, and more particularly a flow splitter and a rain separator comprising the same.

Conventional rainwater separators are fixedly disposed in an underground water channel and cannot selectively collect initial rainwater and late rainwater as needed.

SUMMARY

The disclosure provides a flow splitter comprising a first plate being immobile and a second plate being turnable with respect to the first plate; the first plate comprises a central part, and the central part comprises a slot and two side parts disposed at two ends of the slot, respectively; the second plate comprises a first subplate and a second subplate, and the first subplate comprises one end provided with a flange.

The second plate is coupled to the first plate, and the first subplate and the second subplate are disposed at two side of the slot; two sides of the second plate comprise two gaps, respectively; and the two side parts of the first plate are disposed in the two gaps, respectively; the critical condition of the overturn of the second plate with respect to the first plate is $$m_3 g L_3 \le m_2 g L_2 + m_1 g \frac{L_1}{2};$$

in the overturn state, the following condition is satisfied: $m_3gL_3 \le m_2gL_3 + m_4gL_5$; the critical condition of resetting of the second plate is $m_3gL_3 > m_2gL_2 + m_5gL_7$; represents a mass of present rainwater when the second plate is about to overturn; $L_1$ represents a length of the first subplate; $m_2$ represents a mass of the first subplate; $L_2$ represents a distance between a center of gravity of the first subplate and the slot; $m_3$ represents a mass of the second subplate; $L_3$ represents a distance between a center of gravity of the second subplate and the slot; $m_4$ represents a mass of present rainwater on the first subplate in the overturn state of the second plate; $m_5$ represents a mass of present rainwater on the first subplate when the second plate is about to reset; $L_5$ represents a lever arm of present rainwater on the first subplate in the overturn state of the second plate; $L_7$ represents a lever arm of present rainwater on the first subplate when the second plate is about to reset; and g represents a gravitational constant.

The first plate can comprise two subplates and a rotation axle or an articulated mechanism; and the second plate can be coupled to the first plate via the rotation axle or the articulated mechanism.

The flange can comprise a discharge outlet.

Also provided is a rain separator comprising a water inlet, a grating covering the water inlet, the aforesaid device disposed in the water inlet, a first collecting pipe, a second collecting pipe, a bottom wall opposite to the water inlet, and a side wall; the first collecting pipe and the second collecting pipe are disposed on the bottom wall; the first subplate and the first collecting pipe are disposed on a first side of the first plate; the second subplate and the second collecting pipe are disposed on a second side of the first plate; the second subplate extends to the second collecting pipe and the second collecting pipe is configured to collect initial rainwater; the first collecting pipe is configured to collect middle and late rainwater; the bottom wall comprises a plurality of bulges, and the side wall comprises a sliding rail; one end of the first plate butts against the sliding rail, and the other end of the first plate butts against one of the plurality of bulges.

A filter net can be disposed below the grating.

The bottom wall can incline downwards at 5° towards the second collecting pipe.

In the drawings, the following reference numbers are used: 1. Grating; 2. Filter net; 3. First plate; 4. Second plate; 5. Rotation axle; 6. Slot; 7. Bulge; 8. First collecting pipe; 9. Second collecting pipe; 10. Discharge outlet; 11. Sliding rail; 12. Bottom Wall; 13. Second Side Wall; 14. First Side Wall; 15. Flange; 16. Two Gaps; 41. First Subplate; 42. Second Subplate.

DETAILED DESCRIPTION OF THE EMBODIMENTS

To further illustrate, embodiments detailing a flow splitter and a rain separator comprising the same are described below. It should be noted that the following embodiments are intended to describe and not to limit the disclosure.

Figure 1:
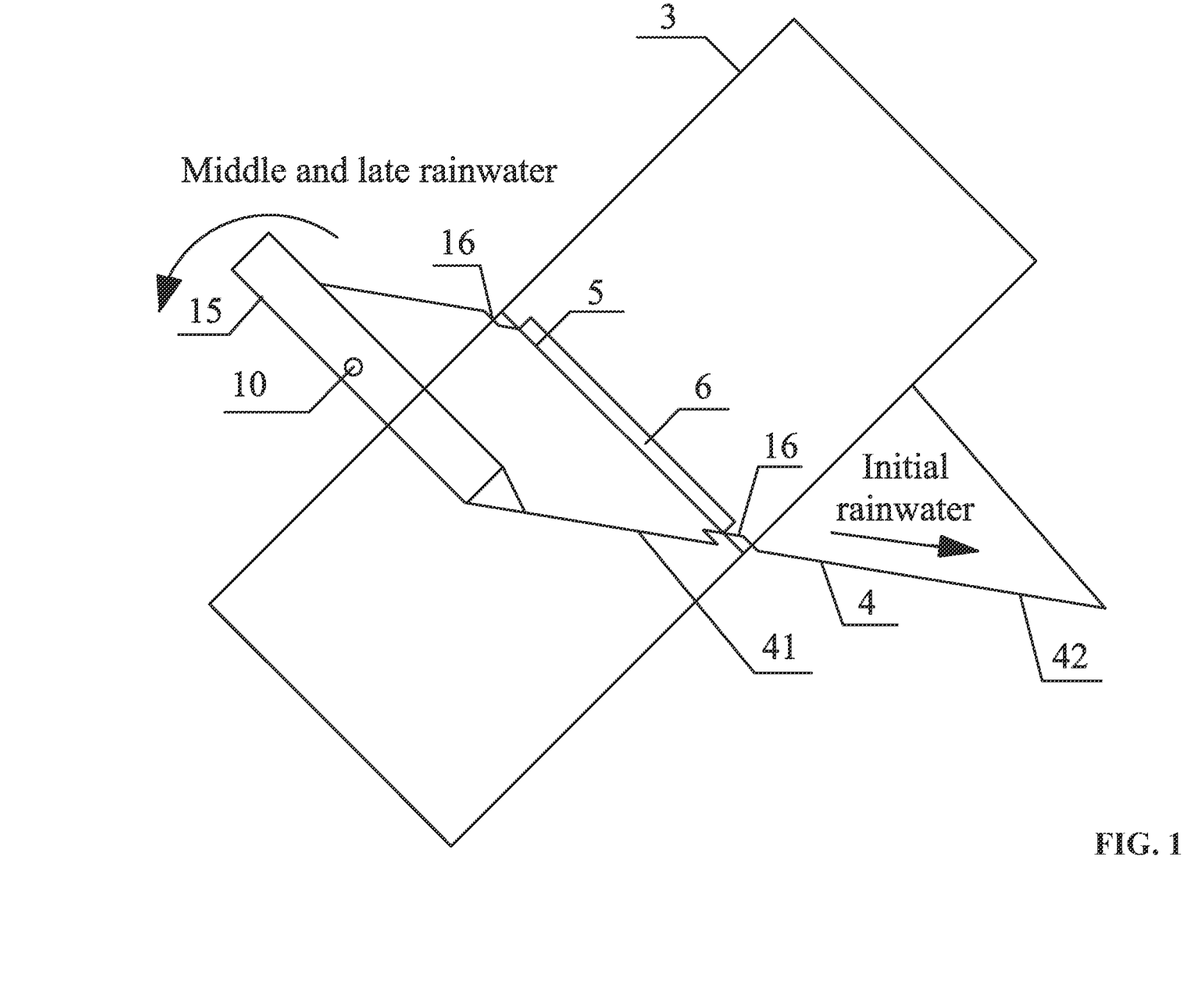
FIG. 1 is a schematic view of a flow splitter according to one embodiment of the disclosure.
Figure 2:
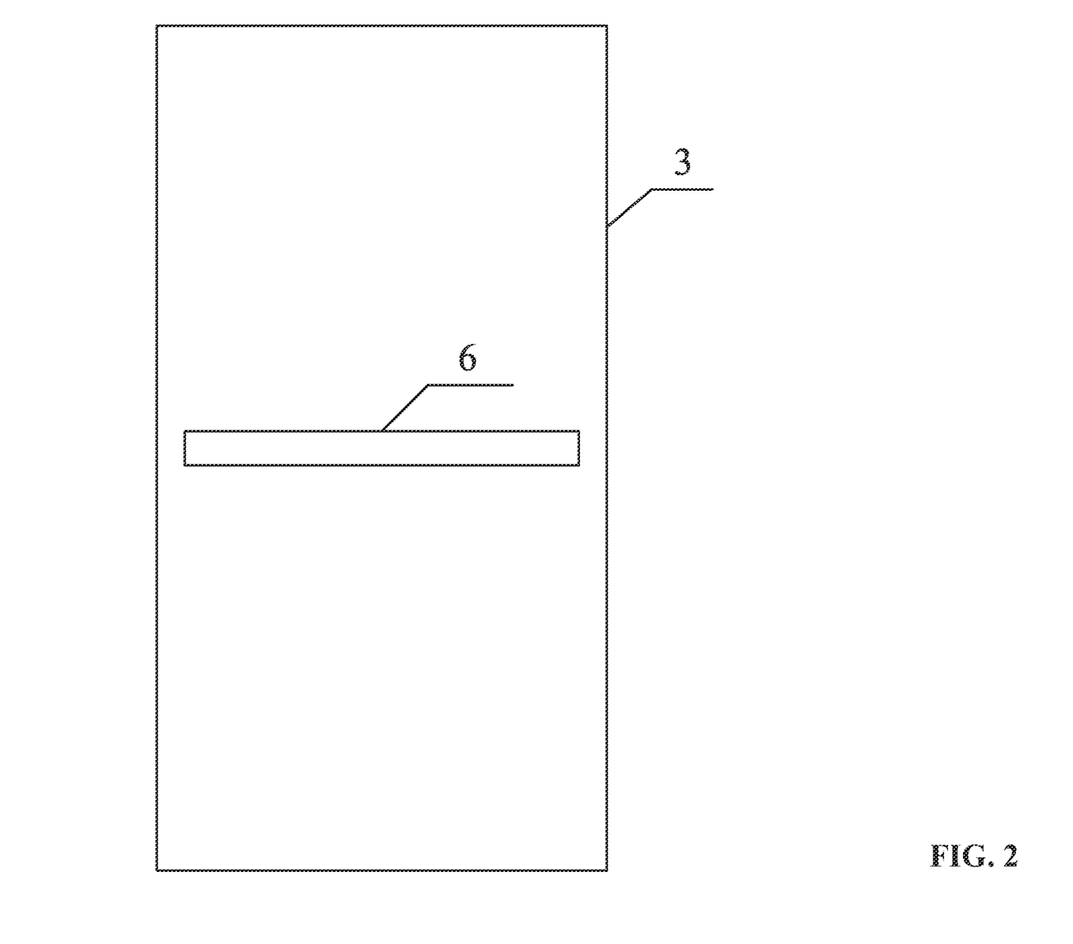
FIG. 2 is a plan view of a first plate according to one embodiment of the disclosure.
Figure 3:
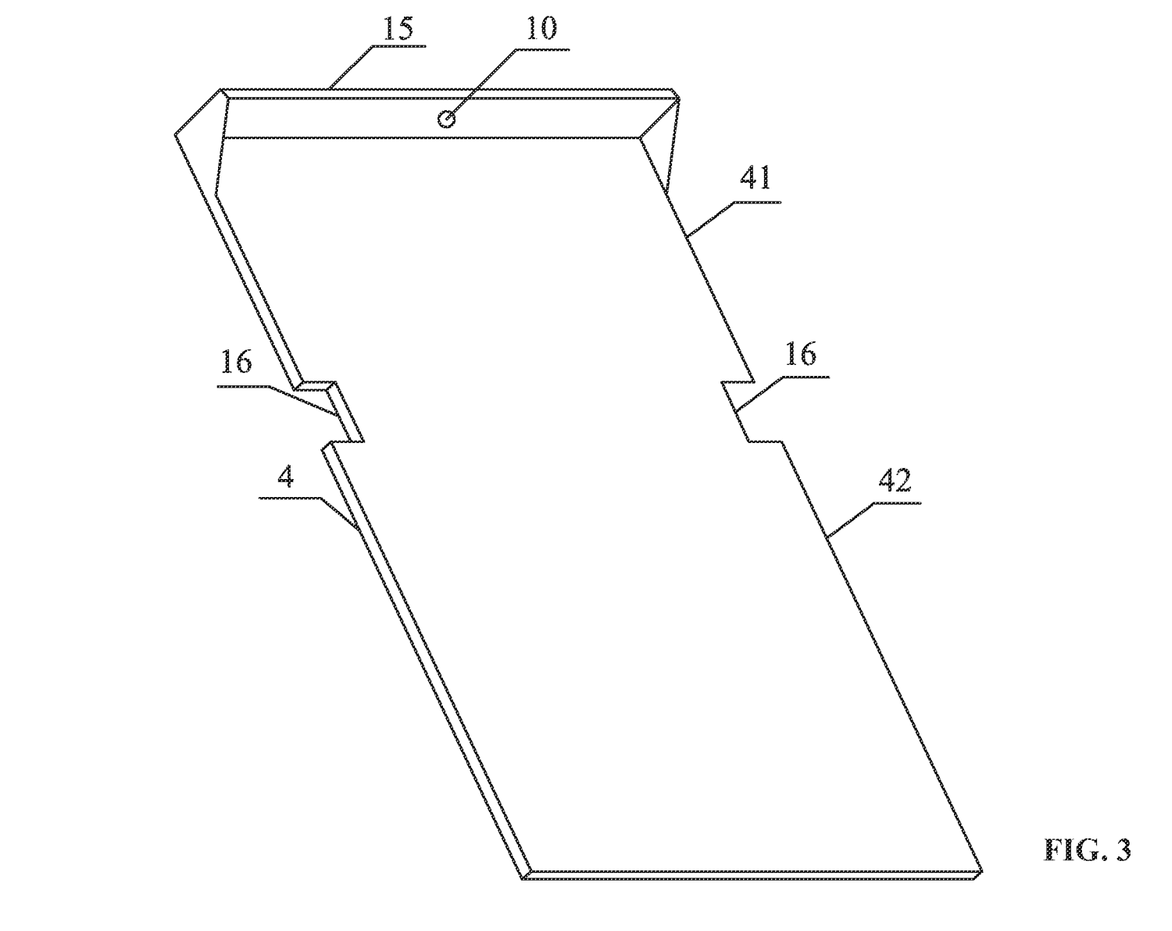
FIG. 3 is a schematic view of a second plate according to one embodiment of the disclosure.

As shown in FIGS. 1-3, the disclosure provides a flow splitter comprising a first plate 3 and a second plate 4; the first plate 3 comprises a central part, and the central part comprises a slot 6; two sides of the second plate 4 comprise two gaps 16, respectively; and the second plate 4 is coupled to the first plate 3 via the slot 6.

As shown in FIG. 2, the first plate 3 comprises two side parts; a rotation axle 5 is disposed at one side of the slot 6 to fix the second plate 4, and the second plate 4 is freely rotatable about the rotation axle 5; after the second plate 4 is fixed via the rotation axle 5 and the slot 6, the two side parts are combined to form the first plate 3; and the second plate 4 can also be coupled with the first plate 3 via a articulated mechanism.

As shown in FIG. 3, the second plate 4 comprises a first subplate 41 and a second subplate 42; the first subplate 41 comprises one end provided with a flange 15; and the flange 15 comprises a discharge outlet 10.

Figure 4:
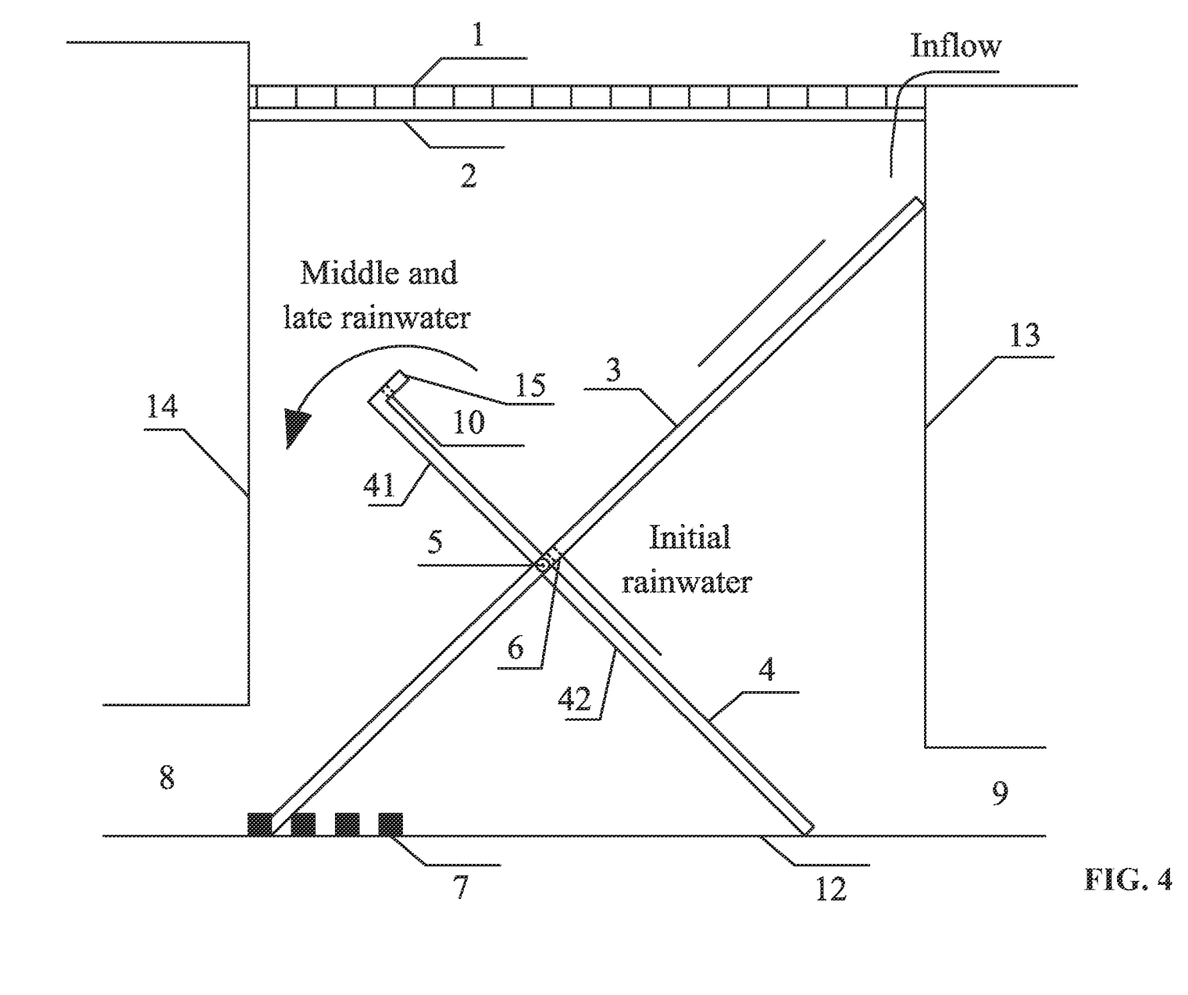
FIG. 4 is a schematic view of a rain separator according to one embodiment of the disclosure.
Figure 5:
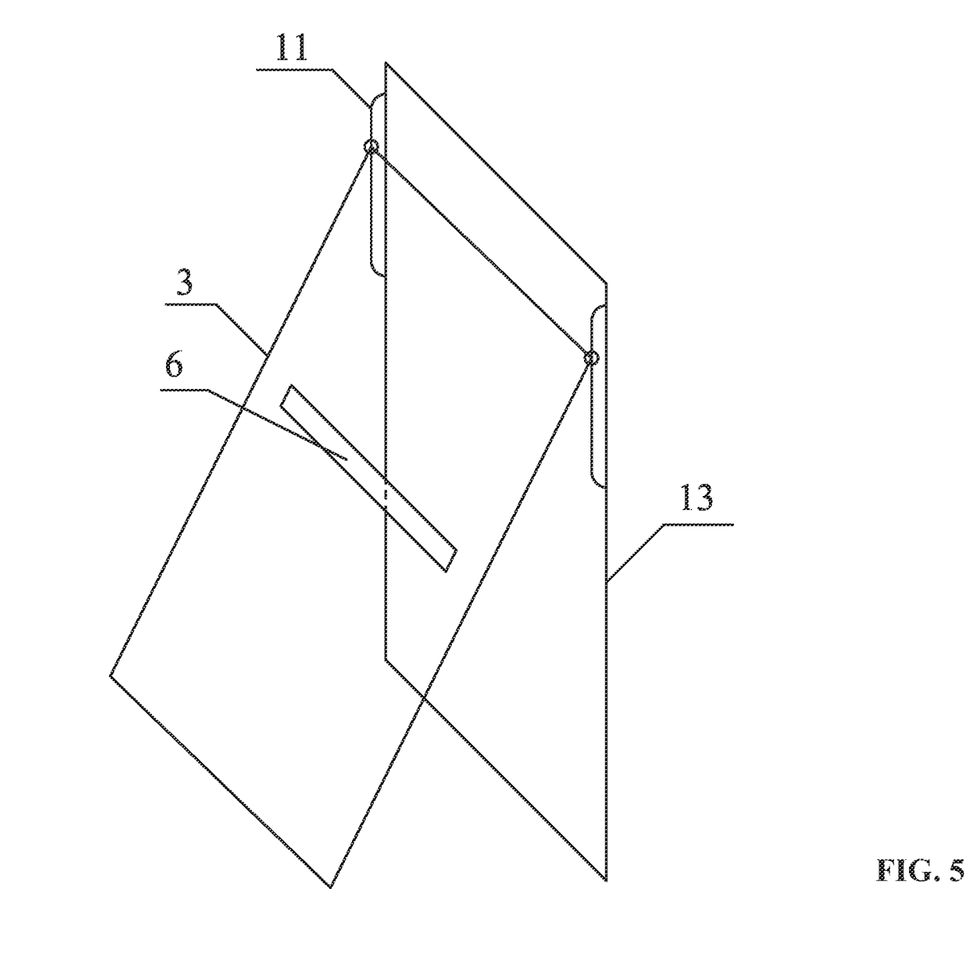
FIG. 5 is a schematic view showing a first plate leaning against a sliding rail according to one embodiment of the disclosure.

As shown in FIG. 4, the rain separator comprises a water inlet, the aforesaid flow splitter disposed in the water inlet, a grating 1 covering the water inlet, a filter net 2 disposed below the grating 1, a bottom wall 12 opposite to the water inlet, a second side wall 13, and a first collecting pipe 8 and a second collecting pipe 9 both disposed on the bottom wall 12, a plurality of bulges 7 disposed on the bottom wall 12 close to the first collecting pipe 8; one end of the first plate 3 butts against one of the plurality of bulges 7. As shown in FIG. 5, the other end of the first plate 3 butts against the sliding rail 11. Therefore, the inclination of the first plate 3 is determined by the sliding rail 11 and the bulges 7.

The width of the first plate 3 of the flow splitter is equal to that of the space below the water inlet, ensuring that rainwater does not flow out from the gap between the first plate 3 and the second side wall 13. The second plate 4 is not connected to the second side wall 13, which is more advantageously used in adjusting the angle between the first plate 3 and the second plate 4.

As shown in FIG. 4, the lower parts of the first plate 3 and the second plate 4 below the rotation axle 5 and the bottom wall 12 form an isosceles triangle with an apex angle of θ. When one end of the first plate 3 butts against one of the bulges 7 closest to the first collecting pipe 8, the second plate 4 rotates around the rotation axle 5 which is considered as the center of a circle, thereby realizing the separation of the initial rainwater, and middle and late rainwater.

The slot 6 is configured to continuously discharge the abandoned initial rainwater. The flange on one side of the second plate 4 is configured to keep the second plate 4 in the overturn state when the less rainwater is accumulated in the late stage. This can prevent the flow splitter from returning to its original position in the late stages, and improve the rainwater collecting efficiency.

The discharge outlet 10 disposed on the flange 15 is configured to direct the accumulated rainwater out of the second plate 4 when the rainfall is stopped, and a sudden decrease in the weight of the accumulated rainwater drives the flow splitter returns to the original position.

To maintain the stability of the rain separator, the first plate 3 is configured to butts against the second side wall 13 in different connection manners. It is preferable to provide a sliding rail 11 with a fixed length in the vertical direction to connect the first plate 3.

The bottom wall is inclined downwards at 5° towards the second collecting pipe 9, which is beneficial to prevent sediment accumulation and to facilitate cleaning.

The working principle of the rain separator is described as follows:

The rainwater runoff from urban roads flows through a grating 1 and a filter net 2 into a water inlet, thus intercepting large-particle impurities such as leaves and reducing the probability of blockage of the pipes. The sanitation workers are responsible for cleaning up these intercepted impurities.

Figure 6:
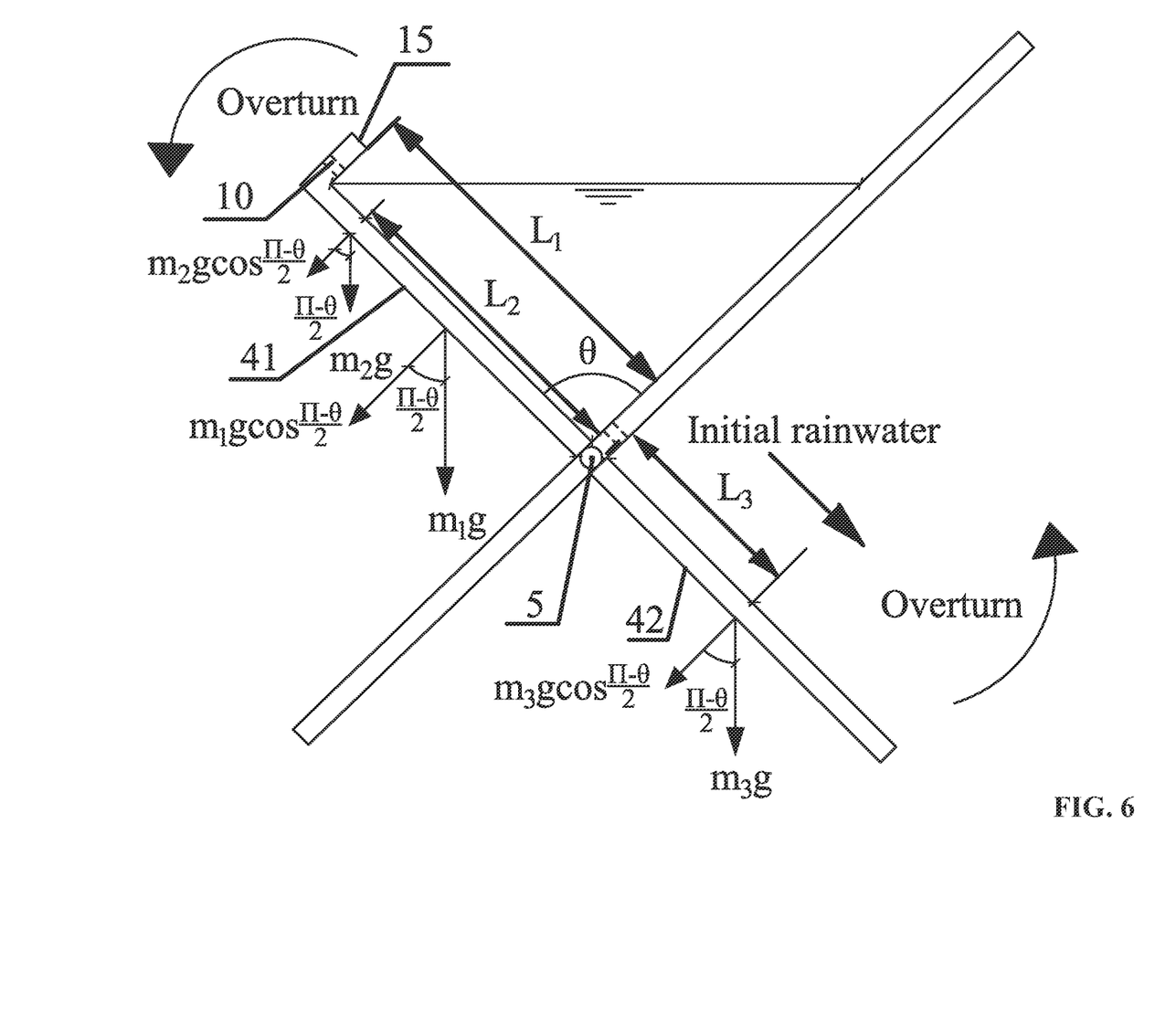
FIG. 6 is a force analysis for a flow splitter that is about to be turned over according to one embodiment of the disclosure.
Figure 7:
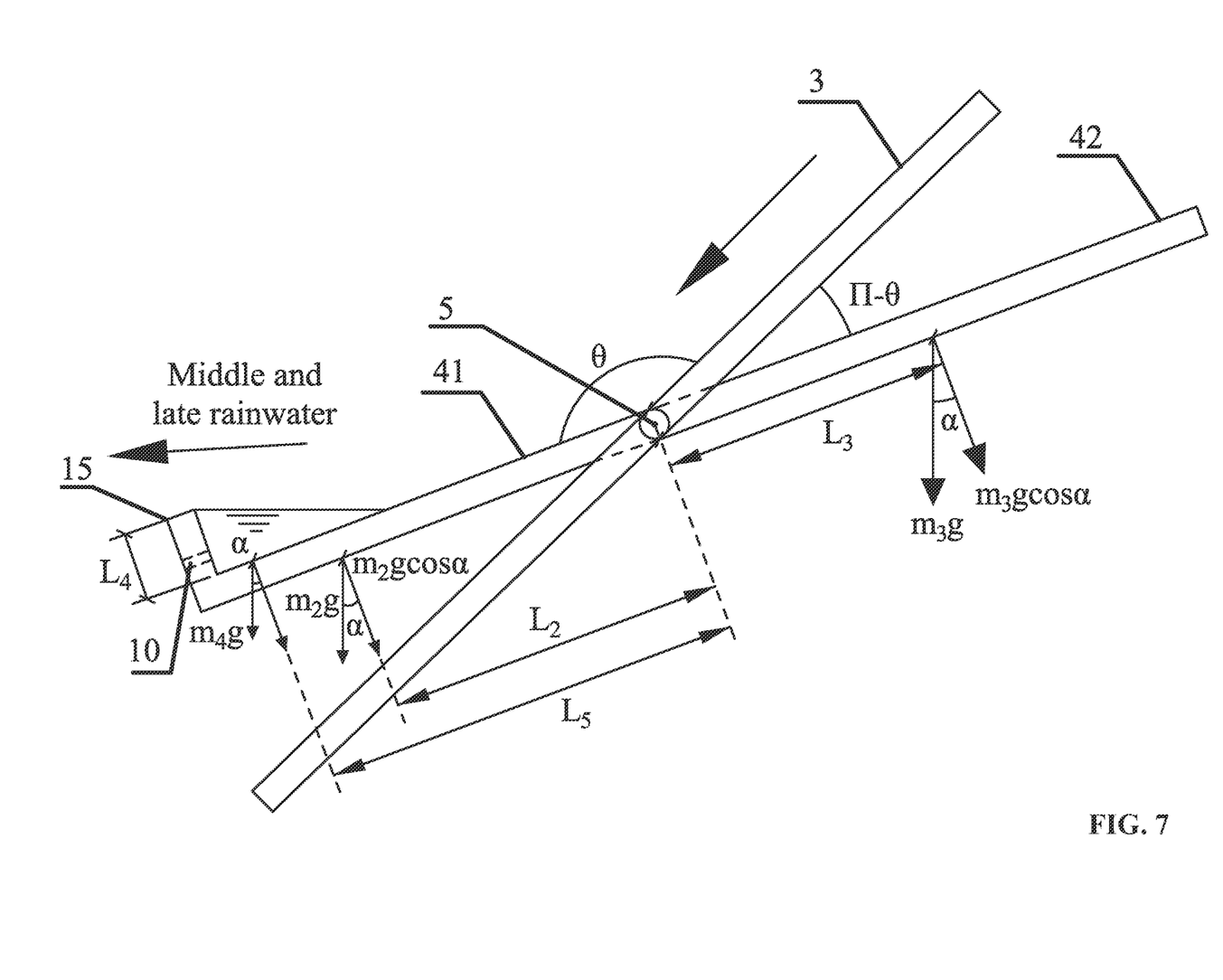
FIG. 7 is a force analysis for a flow splitter after being turned over.

The first plate 3 comprises a slot 6. When the initial rainwater filtered by the filter net 2 flows along the first plate 3 to the rotating axle 5, a part of rainwater flows out from the second collecting pipe 9 through the slot 6. The inflow rate of the middle and late rainwater is greater than the outflow rate thereof in the slot 6, the rainwater was accumulated between the first plate 3 and the second plate 4. As shown in FIGS. 6-7, when the accumulated rainwater rises up to a certain height, the second plate 4 is tilted down and overturned under the moment generated by gravity force acting upon the water accumulated at the flange 15 of the second plate 4. The accumulated rainwater on the first plate 3 and second plate 4 thus flows into the first collecting pipe 8 on the bottom wall 12. At this point, the automatic abandonment process for the initial rainwater and the middle and late rainwater is completed.

When there is no rainwater entering the water inlet, the accumulated rainwater at the flange 15 of the second plate 4 flows out from the discharge outlet 10, thus reducing the weight of the accumulated rainwater. When the moment acting upon the flange 15 of the second plate 4 is smaller than the moment on the other side thereof, the flow splitter returns to its original position for preparation of next rainfall, thus realizing automatic resetting of the second plate 4 under no power control. When the interval between the two adjacent rainfalls is short, there is no need to discard the rainwater, and the next initial rainwater can be collected directly.

The amount of abandoned initial rainwater can be adjusted according to the seasonal shifts in rainfall. The flow splitter of the disclosure capable of adjusting the amount of abandoned initial rainwater by means of the following method. A plurality of bulges 7 having a square cross section are disposed on the bottom wall 12 near the collecting pipe 8 for fixing the first plate 3. The amount of abandoned rainwater is determined by the angle between the first plate 3 and the second plate 4. The less initial rainwater is abandoned when the angle is closer to 90°, which realizes the adjustment of the amount of abandoned initial rainwater.

FIG. 6 shows the force analysis in the critical condition of an overturn of the second plate 4. The weight of accumulated rainwater on the plates is based on the following formula:

$$m_1 = \tfrac{1}{2} \sin \theta L_1^2 B \tag{1}$$

B—the width of the first plate and the second plate;
θ—the angle between the first plate and the second plate, which varies within a range of (0, Π);
ρ—the density of rainwater;
$L_1$—the length of the first subplate 41;
the critical condition of the overturn of the second plate 4 with respect to the first plate is:

$$m_3 g \cos \frac{\Pi - \theta}{2} L_3 \leq m_2 g \cos \frac{\Pi - \theta}{2} L_2 + m_1 g \cos \frac{\Pi - \theta}{2} \frac{L_1}{2} \tag{2}$$

simplified to:

$$m_3 g L_3 \leq m_2 g L_2 + m_1 g \frac{L_1}{2} \tag{3}$$

$m_3$—the mass of the second subplate 42;
$L_3$—the distance between a center of gravity of the second subplate 42 and the slot;
$m_2$—the mass of the first subplate 41;
$L_2$—the distance between a center of gravity of the first subplate 41 and the slot;

As shown in FIG. 7, in the middle and late stages the second plate 4 keeps in this state by gravity component of the accumulated rainwater at the flange 15. Thus, the flow splitter is capable of collecting continuously the rainwater in the middle and late stages, and realizing the automatic abandonment for the initial rainwater and the middle and late rainwater.

The mass of present rainwater on the flange 15 of the second plate 4 is based on the following formula:

$$m_4 = \tfrac{1}{2} L_4^2 B\rho \qquad (4)$$

L4—the height of the flange 15 of the second plate 4.

In the overturn state, the following condition is satisfied:

$$m_3 g \cos \alpha L_3 \leq m_2 g \cos \alpha L_2 + m_4 g \cos \alpha L_5 \qquad (5)$$

α—the angle between component force of gravity and gravity.

$L_5$—the lever arm of present rainwater on the first subplate 41 in the overturn state of the second plate.

Figure 8:
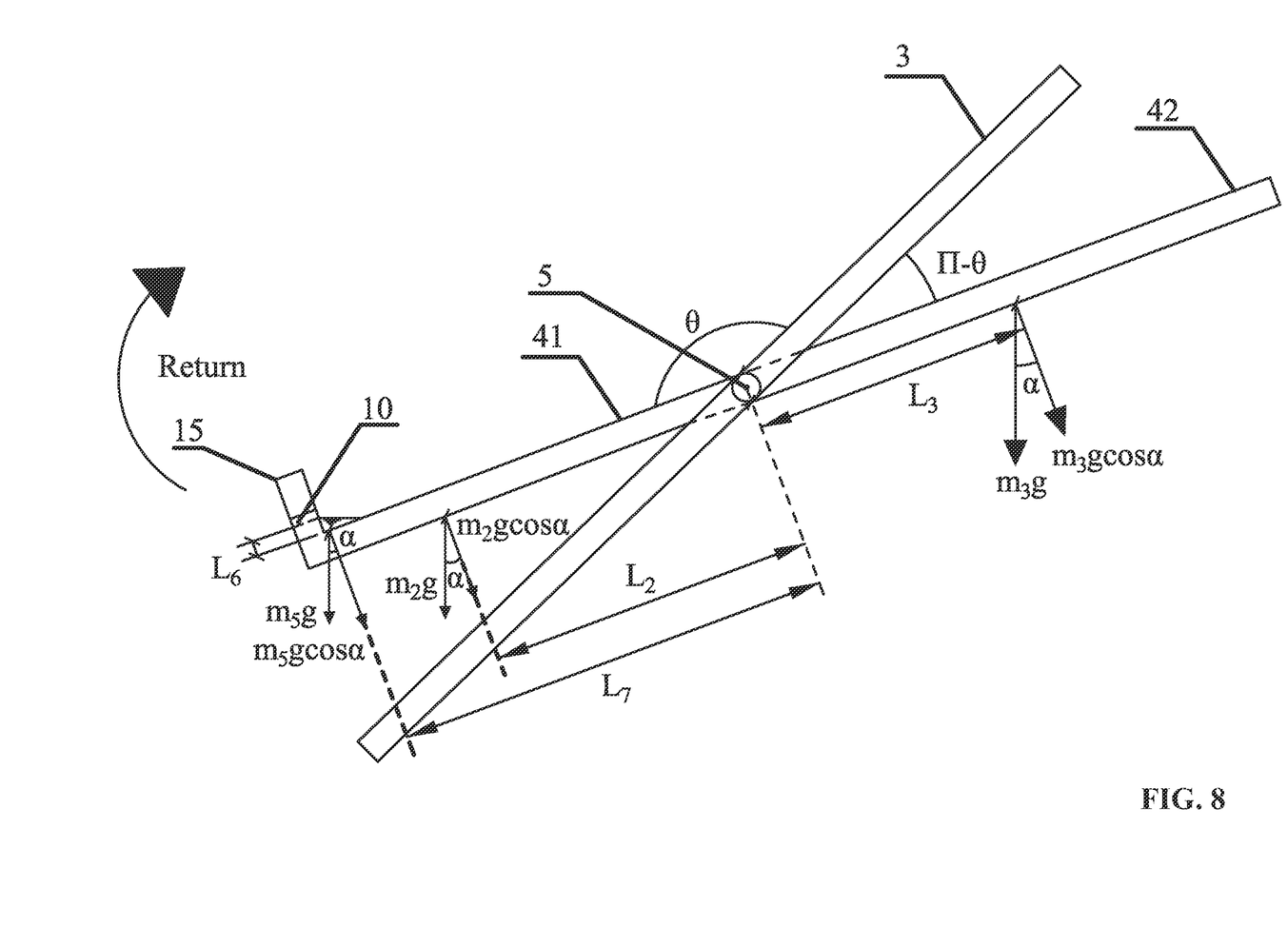
FIG. 8 is a force analysis for a flow splitter that is about to return to an original position.

As shown in FIG. 8, when there is no available rainwater entering the water inlet, the accumulated rainwater on the flange 15 of the second plate 4 flows out from the discharge outlet 10, thus reducing the weight of the accumulated rainwater. When the acting upon the flange 15 of the second plate 4 is smaller than the moment on the other side thereof, the flow splitter returns to its original position for preparation of next rainfall, thus realizing automatic resetting of the second plate 4 without power control.

After the resetting of the second plate, the mass of the present rainwater on the first subplate 41 is based on the following formula:

$$m_5 = \tfrac{1}{2} L_6^2 B\rho \qquad (6)$$

$L_6$—the distance from the bottom of the discharge outlet 10 to the second plate 4.

the critical condition of resetting of the second plate 4 is:

$$m_3 g \cos \alpha L_3 > m_2 g \cos \alpha L_2 + m_5 g \cos \alpha L_7 \qquad (7)$$

$L_7$—the lever arm of present rainwater on the first subplate 41 when the second plate is about to reset;

The amount of the abandoned initial rainwater can be adjusted according to the seasonal shifts in rainfall. A plurality of bulges 7 having a square cross section are disposed on the bottom wall 12 near the first collecting pipe 8 to fix the first plate 3. The amount of abandoned rainwater is determined by the angle between the first plate 3 and the second plate 4.

Formula (8) can be calculated based on the formulas (1) and (3):

$$m_3 g L_3 \leq m_2 g L_2 + \tfrac{1}{2} \sin\theta L_1^2 B\rho g \tfrac{L_1}{2} \qquad (8)$$

The flow splitter is easy to overturn when the angle θ is equal to 90° according to the graph of function sin θ. To construct angles of different degrees, the first plate 3 is butted against one of a plurality of bulges 7. When the angle θ is close to the right angle, the second plate is easily overturned, and less initial rainwater is abandoned. When the angle is close to 0° or 180°, the second plate is difficult to overturn, and more initial rainwater is abandoned, thereby achieving the adjustment of the abandonment amount of the initial rainwater.

It will be obvious to those skilled in the art that changes and modifications may be made, and therefore, the aim in the appended claims is to cover all such changes and modifications.

What is claimed is:
1. A device, comprising:
1) a first plate comprising a slot and a rotation axle mounted in the slot wherein the rotation axle defines a pivot axis extending along a length of the slot; and
2) a second plate comprising a first subplate and a second subplate connected to the first subplate, and the first subplate comprising one end provided with a flange;

wherein:
the second plate further comprises two gaps disposed on a junction of the first subplate and the second subplate;
the two gaps are configured to snap fit with an edge of the slot at two ends, respectively;
the second plate is coupled to the first plate through the slot and mounted on the rotation axle; the second plate is pivotally supported with respect to the first plate about the pivot axis;
a critical condition of an overturn of the second plate with respect to the first plate is $$m_3 g L_3 \leq m_2 g L_2 + m_1 g \frac{L_1}{2};$$

in the overturn state of the second plate, the following condition is satisfied: $m_3 g L_3 \leq m_2 g L_2 + m_4 g L_5$; a critical condition of resetting of the second plate is $m_3 g L_3 > m_2 g L_2 + m_5 g L_7$;

$m_1$ represents a mass of present rainwater when the second plate is about to overturn;
$L_1$ represents a length of the first subplate;
$m_2$ represents a mass of the first subplate;
$L_2$ represents a normal distance between a center of gravity of the first subplate and the pivot axis;
$m_3$ represents a mass of the second subplate;
$L_3$ represents a normal distance between a center of gravity of the second subplate and the the pivot axis;
$m_4$ represents a mass of present rainwater on the first subplate in the overturn state of the second plate;
$m_5$ represents a mass of present rainwater on the first subplate when the second plate is about to reset;
$L_5$ represents a normal distance between a point of application of a force by present rainwater on the first subplate and the pivot axis when the second plate is in the overturn state;
$L_7$ represents a normal distance between a point of application of a force by present rainwater on the first subplate and the pivot axis when the second plate is about to reset; and
g represents a gravitational constant.

2. The device of claim 1, wherein the flange comprises a discharge outlet.

3. A rain separator, comprising a water inlet, a grating covering the water inlet, the device of claim 1 disposed in the water inlet, a first collecting pipe, a second collecting pipe, a bottom wall opposite to the grating, a first side wall, and a second side wall opposite to the first side wall; wherein the first collecting pipe is disposed on a bottom of the first side wall; and the second collecting pipe is disposed on a bottom of the second side wall; a plurality of bulges are disposed on the bottom wall adjacent to the first collecting pipe; and the second side wall comprises a sliding rail; the water inlet comprises an upper space communicated with the first collecting pipe and a lower space communicated with the second collecting pipe; one end of the first plate butts against the sliding rail, and the other end of the first plate butts against one of the plurality of bulges whereby the upper space is adapted to communicate with the lower space via the slot of the first plate; the first subplate is disposed in the upper space and is oriented such that the flange faces the grating; the second subplate is disposed in the lower space; when the second subplate is adjacent to the bottom wall with respect to the first subplate, the slot is open such that rainwater is adapted to flow through the slot to the lower space then to the second collecting pipe; when the first subplate is adjacent to the bottom wall with respect to the second subplate, the slot is blocked such that rainwater is adapted to flow through the upper space to the first collecting pipe.

4. The rain separator of claim 3, wherein a filter net is disposed below the grating.

5. The rain separator of claim 4, wherein the bottom wall is inclined downwards at 5° towards the second collecting pipe.

\* \* \* \* \*